United States Patent
Hapsari et al.

(10) Patent No.: US 9,681,475 B2
(45) Date of Patent: Jun. 13, 2017

(54) MOBILE COMMUNICATION SYSTEM

(71) Applicant: NTT DOCOMO, INC., Tokyo (JP)

(72) Inventors: Wuri Andarmawanti Hapsari, Tokyo (JP); Tooru Uchino, Tokyo (JP); Kenichiro Aoyagi, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 68 days.

(21) Appl. No.: 14/781,942

(22) PCT Filed: Apr. 1, 2014

(86) PCT No.: PCT/JP2014/059657
§ 371 (c)(1),
(2) Date: Oct. 2, 2015

(87) PCT Pub. No.: WO2014/163085
PCT Pub. Date: Oct. 9, 2014

(65) Prior Publication Data
US 2016/0044722 A1 Feb. 11, 2016

(30) Foreign Application Priority Data

Apr. 2, 2013 (JP) .................................. 2013-077040

(51) Int. Cl.
*H04W 76/02* (2009.01)
*H04W 28/24* (2009.01)
*H04W 72/12* (2009.01)

(52) U.S. Cl.
CPC ......... *H04W 76/022* (2013.01); *H04W 28/24* (2013.01); *H04W 72/1242* (2013.01)

(58) Field of Classification Search
None
See application file for complete search history.

(56) References Cited

U.S. PATENT DOCUMENTS

2012/0093086 A1* 4/2012 Yin .................. H04L 69/16
370/328
2012/0120831 A1* 5/2012 Gonsa ................ H04W 76/025
370/252

(Continued)

FOREIGN PATENT DOCUMENTS

WO 2012/138714 A1 10/2012

OTHER PUBLICATIONS

International Search Report issued in PCT/JP2014/059657 mailed on Jul. 1, 2014 (1 page).

(Continued)

*Primary Examiner* — Hassan Kizou
*Assistant Examiner* — Hashim Bhatti
(74) *Attorney, Agent, or Firm* — Osha Liang LLP

(57) ABSTRACT

An object is to perform a priority control that is more elaborate than that is performed by using a QCI. In a mobile communication system according to the present invention, a mobility management node MME notifies a radio base station eNB, in an "Initial Context Setup procedure" or an "E-RAB Setup Procedure", following pieces of information in an associated form: an "E-RAB ID" of an E-RAB to be established between a gateway device S-GW and a mobile station UE; one QCI that is assigned to the E-RAB; and one FPI that is assigned to data flow transmitted on the E-RAB. A radio base station eNB establishes, in response to the notification, one S1 bearer corresponding to the E-RAB between the gateway device S-GW and the radio base station and one DRB corresponding to the E-RAB between the mobile station UE and the radio base station.

3 Claims, 12 Drawing Sheets

(56) References Cited

U.S. PATENT DOCUMENTS

| | | | | |
|---|---|---|---|---|
| 2012/0165013 A1* | 6/2012 | Nishida | ............... | H04W 76/068 |
| | | | | 455/435.1 |
| 2012/0250601 A1* | 10/2012 | Choi | ..................... | H04W 88/04 |
| | | | | 370/315 |
| 2012/0269167 A1* | 10/2012 | Velev | ................ | H04W 36/0011 |
| | | | | 370/331 |
| 2013/0051326 A1* | 2/2013 | Jeyatharan | ............ | H04L 47/245 |
| | | | | 370/328 |
| 2013/0252660 A1* | 9/2013 | Bach | ................. | H04W 52/0206 |
| | | | | 455/525 |
| 2014/0162659 A1* | 6/2014 | Aminaka | .............. | H04W 36/14 |
| | | | | 455/437 |

OTHER PUBLICATIONS

Written Opinion of the International Searching Authority issued in PCT/JP2014/059657 mailed on Jul. 1, 2014 (4 pages).
Telecom Italia et al.; "Views on RAN User Plane congestion mitigation"; SA WG2 Meeting #95, S2-130060; Prague, Czech Republic; Jan. 28-Feb. 1, 2013 (6 pages).
Intel, III; "S1-U Congestion Mitigation Solution"; SA WG2 Meeting #96, S2-131103; San Diego, USA; Apr. 8-12, 2013 (14 pages).
Telecom Italia et al.; "Prioritization IP flows mapped to the same QCI"; SA WG2 Meeting 190 96, S2-130776; San Diego, USA; Apr. 8-12, 2013 (6 pages).
Extended European Search Report issued in the counterpart European Patent Application No. 14778815.2, mailed Oct. 11, 2016 (7 pages).

\* cited by examiner

FIG. 3

INITIAL CONTEXT SETUP REQUEST(SAME APPROACH IN E-RAB SETUP)

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 to <maxnoofE-RABs> | | | EACH | reject |
| >>E-RAB ID | M | | 9.2.1.2 | | - | |
| >>E-RAB Level QoS Parameters | M | | 9.2.1.15 | Includes necessary QoS parameters | - | |
| >>Transport Layer Address | M | | 9.2.2.1 | | - | |
| >>GTP-TEID | M | | 9.2.2.2 | | - | |
| >>NAS-PDU | O | | 9.2.3.5 | | - | |
| >>Correlation ID | C | | 9.2.2.80 | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15] | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI ID | O | | 9.2.3.9 | This IE indicates the MME serving the UE | YES | ignore |
| MME UE S1AP ID 2 | O | | 9.2.3.3 | This IE indicates the MME UE S1AP ID assigned by the MME | YES | ignore |
| Management Based MDT Allowed | O | | 9.2.1.83 | | YES | ignore |

| Range bound | Explanation |
|---|---|
| maxnoofE-RABs | Maximum no. of E-RAB allowed towards one UE, the maximum value is 256. |

FIG. 4

9.2.1.15 E-RAB Level QoS Parameters

| IE/Group Name | Presence | Range | IE type and reference | Semantics description |
|---|---|---|---|---|
| E-RAB Level QoS Parameters | | | | |
| >QCI | M | | INTEGER (0..255) | QoS Class Identifier defined in TS 23.401 [11]. Coding specified in TS 23.203 [13]. |
| >FPI | O | | INTEGER (0..256) | Indicate priority of each bearer (= data flow from different application). E-RAB ID is associated with (not only) QCI and QCI+FPI when FPI exists |
| >Allocation and Retention Priority | M | | 9.2.1.60 | |
| >GBR QoS Information | O | | 9.2.1.18 | This IE applies to GBR bearers only and shall be ignored otherwise. |

FIG. 5

RRCConnectionReconfiguration

```
RRCConnectionReconfiguration-r8-IEs ::=  SEQUENCE {
    measConfig                     MeasConfig                  OPTIONAL,   -- Need ON
    mobilityControlInfo            MobilityControlInfo         OPTIONAL,   -- Cond HO
    dedicatedInfoNASList           SEQUENCE (SIZE(1..maxFPI)) OF
                                       DedicatedInfoNAS        OPTIONAL,   -- Cond nonHO
    radioResourceConfigDedicated   RadioResourceConfigDedicated OPTIONAL,  -- Cond HO-toEUTRA
    securityConfigHO               SecurityConfigHO            OPTIONAL,   -- Cond HO
    nonCriticalExtension           RRCConnectionReconfiguration-v890-IEs OPTIONAL
}
```

FIG. 6

*RadioResourceConfigDedicated*

```
-- ASN1START

RadioResourceConfigDedicated ::=    SEQUENCE {
    srb-ToAddModList               SRB-ToAddModList       OPTIONAL,    -- Cond HO-Conn
    drb-ToAddModList               DRB-ToAddModList       OPTIONAL,    -- Cond HO-toEUTRA
    drb-ToReleaseList              DRB-ToReleaseList      OPTIONAL,    -- Need ON
    mac-MainConfig                 CHOICE {
            explicitValue              MAC-MainConfig,
            defaultValue               NULL
    }   OPTIONAL,                                                      -- Cond HO-toEUTRA2
    sps-Config                     SPS-Config             OPTIONAL,    -- Need ON
    physicalConfigDedicated        PhysicalConfigDedicated OPTIONAL,   -- Need ON
    ...,
    [[  rlf-TimersAndConstants-r9  RLF-TimersAndConstants-r9   OPTIONAL  -- Need ON
    ]],
    [[  measSubframePatternPCell-r10  MeasSubframePatternPCell-r10  OPTIONAL  -- Need ON
    ]],
    [[  neighCellsCRS-Info-r11     NeighCellsCRS-Info-r11     OPTIONAL  -- Need ON
    ]]
}

DRB-ToAddModList ::=                SEQUENCE (SIZE (1..maxFPI)) OF DRB-ToAddMod

DRB-ToAddMod ::=       SEQUENCE {
    eps-BearerIdentity             INTEGER (0..15)        OPTIONAL,    -- Cond DRB-Setup
    drb-Identity                   DRB-Identity,
    pdcp-Config                    PDCP-Config            OPTIONAL,    -- Cond PDCP
    rlc-Config                     RLC-Config             OPTIONAL,    -- Cond Setup
    logicalChannelIdentity         INTEGER (3..10)        OPTIONAL,    -- Cond DRB-Setup
    logicalChannelConfig           LogicalChannelConfig   OPTIONAL,    -- Cond Setup
    ...
}

DRB-ToReleaseList ::=               SEQUENCE (SIZE (1..maxDRB)) OF DRB-Identity

-- ASN1STOP
```

FIG. 8

9.2.1.15    E-RAB Level QoS Parameters

| IE/Group Name | Presence | Range | IE type and reference | Semantics description |
|---|---|---|---|---|
| E-RAB Level QoS Parameters | | | | |
| >QCI | M | | INTEGER (0..255) | QoS Class Identifier defined in TS 23.401 [11]. Coding specified in TS 23.203 [13]. |
| >>FPIList | | 1 to <maxN umofFP l> | | |
| >>>FPI | O | | INTEGER (0..256) | Used to indicate how many DRB per QCI needs to be setup. |
| >Allocation and Retention Priority | M | | 9.2.1.60 | |
| >GBR QoS Information | O | | 9.2.1.18 | This IE applies to GBR bearers only and shall be ignored otherwise. |

FIG. 9

RRCConnectionReconfiguration

```
RRCConnectionReconfiguration-r8-IEs ::= SEQUENCE {
    measConfig                       MeasConfig                      OPTIONAL,    -- Need ON
    mobilityControlInfo              MobilityControlInfo             OPTIONAL,    -- Cond HO
    dedicatedInfoNAS_QCIList         SEQUENCE
    perQCIdedicatedInfoNASList       SEQUENCE (SIZE(1..maxQCI)) OF DedicatedInfoNASList      OPTIONAL,
    dedicatedInfoNASList             SEQUENCE (SIZE(1..maxDRB)) OF
                                       DedicatedInfoNAS perDRBList   OPTIONAL,    -- Cond nonHO
    radioResourceConfigDedicated     RadioResourceConfigDedicated    OPTIONAL,    -- Cond HO-toEUTRA
    securityConfigHO                 SecurityConfigHO                OPTIONAL,    -- Cond HO
    nonCriticalExtension             RRCConnectionReconfiguration-v890-IEs  OPTIONAL
}
```

FIG. 10

*RadioResourceConfigDedicated*

```
-- ASN1START

RadioResourceConfigDedicated ::=     SEQUENCE {
    srb-ToAddModList                 SRB-ToAddModList                OPTIONAL,    -- Cond HO-Conn
    drb-ToAddModList                 DRB-ToAddModList                OPTIONAL,    -- Cond HO-toEUTRA
    drb-ToReleaseList                DRB-ToReleaseList               OPTIONAL,    -- Need ON
    mac-MainConfig                   CHOICE {
        explicitValue                    MAC-MainConfig,
        defaultValue                     NULL
    }                                                                OPTIONAL,    -- Cond HO-toEUTRA2
    sps-Config                       SPS-Config                      OPTIONAL,    -- Need ON
    physicalConfigDedicated          PhysicalConfigDedicated         OPTIONAL,    -- Need ON
    ...,
    [[ rlf-TimersAndConstants-r9     RLF-TimersAndConstants-r9       OPTIONAL     -- Need ON
    ]],
    [[ measSubframePatternPCell-r10  MeasSubframePatternPCell-r10    OPTIONAL     -- Need ON
    ]],
    [[ neighCellsCRS-Info-r11        NeighCellsCRS-Info-r11          OPTIONAL     -- Need ON
    ]]
}

PerQCI-DRB-ToAddModList ::=          SEQUENCE (SIZE (1..maxQCI)) OF DRB-ToAddModList DRB-ToAddModList ::=                 SEQUENCE (SIZE (1..maxDRB)) OF DRB-ToAddMod DRB-ToAddMod ::=     SEQUENCE {
    eps-BearerIdentity               INTEGER (0..15)      OPTIONAL,       -- Cond DRB-Setup drb-Identity                     DRB-Identity,
    pdcp-Config                      PDCP-Config          OPTIONAL,       -- Cond PDCP
    rlc-Config                       RLC-Config           OPTIONAL,       -- Cond Setup
    logicalChannelIdentity           INTEGER (3..10)      OPTIONAL,       -- Cond DRB-Setup
    logicalChannelConfig             LogicalChannelConfig OPTIONAL,       -- Cond Setup
    ...
}

DRB-ToReleaseList ::=                SEQUENCE (SIZE (1..maxDRB)) OF DRB-Identity

-- ASN1STOP
```

FIG. 12

9.2.1.15    E-RAB Level QoS Parameters

| IE/Group Name | Presence | Range | IE type and reference | Semantics description |
|---|---|---|---|---|
| E-RAB Level QoS Parameters | | | | |
| >QCI | M | | INTEGER (0..255) | QoS Class Identifier defined in TS 23.401 [11]. Coding specified in TS 23.203 [13]. |
| >>FPIList | | 1 to ≤maxNumofFP≥ | | |
| >>>FPI | O | | INTEGER (0..256) | Used to indicate priority control within one DRB |
| >Allocation and Retention Priority | M | | 9.2.1.60 | |
| >GBR QoS Information | O | | 9.2.1.18 | This IE applies to GBR bearers only and shall be ignored otherwise. |

FIG. 13

RRCConnectionReconfiguration

```
RRCConnectionReconfiguration-r8-IEs ::= SEQUENCE {
    measConfig                      MeasConfig                      OPTIONAL,   -- Need ON
    mobilityControlInfo             MobilityControlInfo             OPTIONAL,   -- Cond HO
    dedicatedInfoNASList            SEQUENCE (SIZE(1..maxDRB)) OF
                                        DedicatedInfoNAS            OPTIONAL,   -- Cond nonHO
    radioResourceConfigDedicated    RadioResourceConfigDedicated    OPTIONAL,   -- Cond HO-toEUTRA
    securityConfigHO                SecurityConfigHO                OPTIONAL,   -- Cond HO
    nonCriticalExtension            RRCConnectionReconfiguration-v890-IEs   OPTIONAL
}
```

FIG. 14

RadioResourceConfigDedicated

```
-- ASN1START

RadioResourceConfigDedicated ::=    SEQUENCE {
    srb-ToAddModList                SRB-ToAddModList        OPTIONAL,   -- Cond HO-Conn
    drb-ToAddModList                DRB-ToAddModList        OPTIONAL,   -- Cond HO-toEUTRA
    drb-ToReleaseList               DRB-ToReleaseList       OPTIONAL,   -- Need ON
    mac-MainConfig                  CHOICE {
        explicitValue                   MAC-MainConfig,
        defaultValue                    NULL
    }                               OPTIONAL,                           -- Cond HO-toEUTRA2
    sps-Config                      SPS-Config              OPTIONAL,   -- Need ON
    physicalConfigDedicated         PhysicalConfigDedicated OPTIONAL,   -- Need ON
    ...,
    [[ rlf-TimersAndConstants-r9    RLF-TimersAndConstants-r9   OPTIONAL    -- Need ON
    ]],
    [[ measSubframePatternPCell-r10 MeasSubframePatternPCell-r10 OPTIONAL   -- Need ON
    ]],
    [[ neighCellsCRS-Info-r11       NeighCellsCRS-Info-r11      OPTIONAL    -- Need ON
    ]]
}

DRB-ToAddModList ::=                SEQUENCE (SIZE (1..maxDRB)) OF DRB-ToAddMod

DRB-ToAddMod ::=    SEQUENCE {
    eps-BearerIdentity              INTEGER (0..15)         OPTIONAL,   -- Cond DRB-Setup
    drb-Identity                    DRB-Identity,
    pdcp-Config                     PDCP-Config             OPTIONAL,   -- Cond PDCP
    rlc-Config                      RLC-Config              OPTIONAL,   -- Cond Setup
    logicalChannelIdentity          INTEGER (3..10)         OPTIONAL,   -- Cond DRB-Setup
    logicalChannelConfig            LogicalChannelConfig    OPTIONAL,   -- Cond Setup
    ...
}

DRB-ToReleaseList ::=               SEQUENCE (SIZE (1..maxDRB)) OF DRB-Identity
```

FIG. 15

PDCP-Config information element

```
-- ASN1START

PDCP-Config ::=                 SEQUENCE {
    discardTimer                    ENUMERATED {
                                        ms50, ms100, ms150, ms300, ms500,
                                        ms750, ms1500, infinity
                                    }                               OPTIONAL,        -- Cond Setup
    rlc-AM                          SEQUENCE {
        statusReportRequired            BOOLEAN
    }                                                               OPTIONAL,        -- Cond Rlc-AM
    rlc-UM                          SEQUENCE {
        pdcp-SN-Size                    ENUMERATED {len7bits, len12bits}
    }                                                               OPTIONAL,        -- Cond Rlc-UM
    headerCompression               CHOICE {
        notUsed                         NULL,
        rohc                            SEQUENCE {
            maxCID                          INTEGER (1..16383)              DEFAULT 15,
            profiles                        SEQUENCE {
                profile0x0001                   BOOLEAN,
                profile0x0002                   BOOLEAN,
                profile0x0003                   BOOLEAN,
                profile0x0004                   BOOLEAN,
                profile0x0006                   BOOLEAN,
                profile0x0101                   BOOLEAN,
                profile0x0102                   BOOLEAN,
                profile0x0103                   BOOLEAN,
                profile0x0104                   BOOLEAN
            },
            ...
        }
    },
    ...,
    [[ rn-IntegrityProtection-r10   ENUMERATED {enabled}     OPTIONAL    -- Cond RN
    ]],
    [[ pdcp-SN-Size-v11x0           ENUMERATED {len15bits}   OPTIONAL    -- Cond Rlc-AM2
    ]],
    [[
        DFPToAddModList             SEQUENCE (SIZE ()) OF DFPInfo     OPTIONAL DFPInfo::=      ENUMERATED {DFP1,DFP2,DFP3,spare1,spare2}
    ]]

}

-- ASN1STOP
```

MOBILE COMMUNICATION SYSTEM

TECHNICAL FIELD

The present invention relates to a mobile communication system.

BACKGROUND ART

How congestion by U-Plane signals on a radio access network side can be avoided is explored in "UPCON (U-Plane Congestion Management) WI (Working Item)" of Release-12 of LTE (Long Term Evolution) system.

In recent years, text, images, videos, streaming, and the like, are transmitted together, even when service is sought from the same web browser.

In such a situation, when congestion occurs on the radio access network side, a preferred order for transmission is, for example, streaming, text, image, and video.

Presently, to control a QoS (Quality of Service), a priority control is implemented in an EPS (Enhanced Packet System) bearer by using a QCI (QoS Class Identifier).

PRIOR ART DOCUMENT

Non-Patent Document

Non-Patent Document 1: 3GPP S2-130060

SUMMARY OF THE INVENTION

In "UPCON WI", a solution is discussed to enable a more elaborate priority control. What is proposed is, in addition to a QCI, defining an "FPI (Flow Priority Indicator)", which indicates a priority for each data flow (IP flow), and performing by (a scheduler of) a radio base station eNB a QoS control and a priority control with the FPI.

However, it is unclear as to how to implement the above solution, specifically, how to implement signaling (S1-AP and RRC) required for C-plane signals on the radio access network side is unclear.

The present invention is made in view of the above problem. An object of the present invention is to provide a mobile communication system capable of performing a priority control that is more elaborate than that is performed by using a QCI.

A mobile communication system according to an aspect of the present invention includes a mobility management node, a gateway device, a radio base station, and a mobile station. The mobility management node notifies the radio base station, in an initial context setup procedure or a bearer setup procedure, following pieces of information in an associated form: identification information of a radio access bearer to be established between the gateway device and the mobile station, one bearer priority that is assigned to the radio access bearer, and one flow priority that is assigned to data flow transmitted on the radio access bearer. The radio base station establishes, in response to the notification, one S1 bearer corresponding to the radio access bearer between the gateway device and the radio base station, and the radio base station establishes, in response to the notification, one data radio bearer corresponding to the radio access bearer between the mobile station and the radio base station.

A mobile communication system according to another aspect of the present invention includes a mobility management node, a gateway device, a radio base station, and a mobile station. The mobility management node notifies the radio base station, in an initial context setup procedure or a bearer setup procedure, following pieces of information in an associated form: identification information of a radio access bearer to be established between the gateway device and the mobile station, one bearer priority that is assigned to the radio access bearer, and a list of flow priorities that is assigned to data flow transmitted on the radio access bearer. The radio base station establishes, in response to the notification, one S1 bearer corresponding to the radio access bearer between the gateway device and the radio base station, and the radio base station establishes, in response to the notification, one or plural data radio bearers corresponding to the flow priorities in the list corresponding to the radio access bearer between the mobile station and the radio base station.

A mobile communication system according to still another aspect of the present invention includes a mobility management node, a gateway device, a radio base station, and a mobile station. The mobility management node notifies the radio base station, in an initial context setup procedure or a bearer setup procedure, following pieces of information in an associated form: identification information of a radio access bearer to be established between the gateway device and the mobile station, one bearer priority that is assigned to the radio access bearer, and a list of flow priorities that is assigned to data flow transmitted on the radio access bearer. The radio base station establishes, in response to the notification, one S1 bearer corresponding to the radio access bearer between the gateway device and the radio base station. The radio base station establishes, in response to the notification, one data radio bearer corresponding to the radio access bearer between the mobile station and the radio base station, and the radio base station instructs the mobile station to set up a priority in a PDCP corresponding to each of the flow priorities on the data radio bearer.

BRIEF DESCRIPTION OF DRAWINGS

FIG. 3 is a diagram of an example of an "Initial Context Setup Request" transmitted by a mobility management node in the mobile communication system according to the first embodiment of the present invention.

FIG. 4 is a diagram of an example of an information element "E-RAB Level QoS Parameters" in the "Initial Context Setup Request" transmitted by the mobility management node in the mobile communication system according to the first embodiment of the present invention.

FIG. 5 is a diagram of an example of an "RRC Connection Reconfiguration" transmitted by a radio base station in the mobile communication system according to the first embodiment of the present invention.

FIG. 6 is a diagram of an example of an information element "Radio Resource Config Dedicated" in the "RRC Connection Reconfiguration" transmitted by the radio base station in the mobile communication system according to the first embodiment of the present invention.

FIG. 8 is a diagram of an example of an information element "E-RAB Level QoS Parameters" in an "Initial Context Setup Request" transmitted by a mobility management node in the mobile communication system according to the second embodiment of the present invention.

FIG. 9 is a diagram of an example of an "RRC Connection Reconfiguration" transmitted by a radio base station in the mobile communication system according to the second embodiment of the present invention.

FIG. 10 is a diagram of an example of an information element "Radio Resource Config Dedicated" in the "RRC Connection Reconfiguration" transmitted by the radio base station in the mobile communication system according to the second embodiment of the present invention.

FIG. 12 is a diagram of an example of an information element "E-RAB Level QoS Parameters" in an "Initial Context Setup Request" transmitted by a mobility management node in the mobile communication system according to the third embodiment of the present invention.

FIG. 13 is a diagram of an example of an "RRC Connection Reconfiguration" transmitted by a radio base station in the mobile communication system according to the third embodiment of the present invention.

FIG. 14 is a diagram of an example of an information element "Radio Resource Config Dedicated" in the "RRC Connection Reconfiguration" transmitted by the radio base station in the mobile communication system according to the third embodiment of the present invention.

FIG. 15 is a diagram of an example of an information element "PDCP-Config" within the information element "Radio Resource Config Dedicated" in the "RRC Connection Reconfiguration" transmitted by the radio base station in the mobile communication system according to the third embodiment of the present invention.

MODE FOR CARRYING OUT THE INVENTION

Mobile Communication System According to First Embodiment of Present Invention

The mobile communication system according to the first embodiment of the present invention will be explained with reference to FIG. 1 to FIG. 6.

Figure 1:
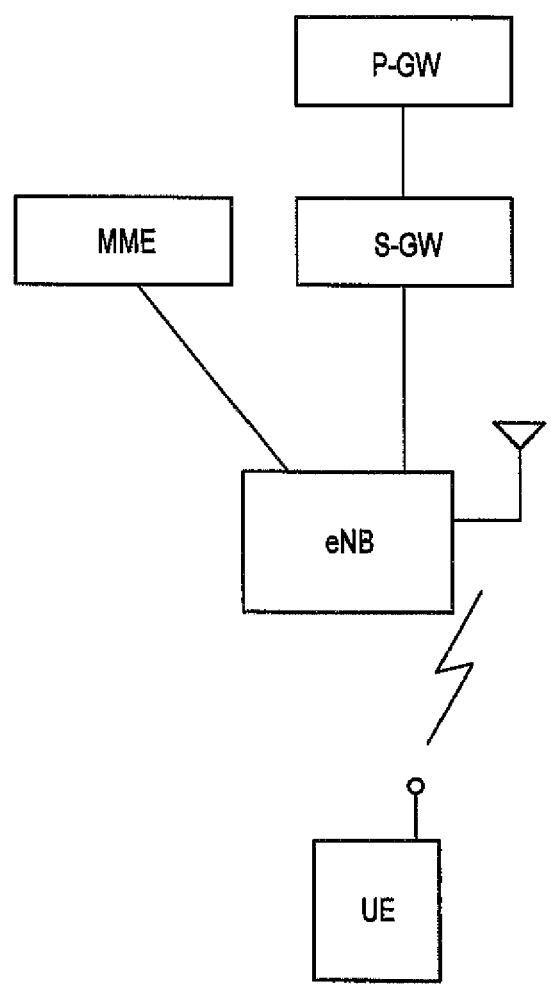
FIG. 1 is a diagram of an overall configuration of a mobile communication system according to a first embodiment of the present invention.

As shown in FIG. 1, the mobile communication system according to the present embodiment includes a mobility management node MME, a gateway device P-GW, a gateway device S-GW, a radio base station eNB, and a mobile station UE.

Figure 2:
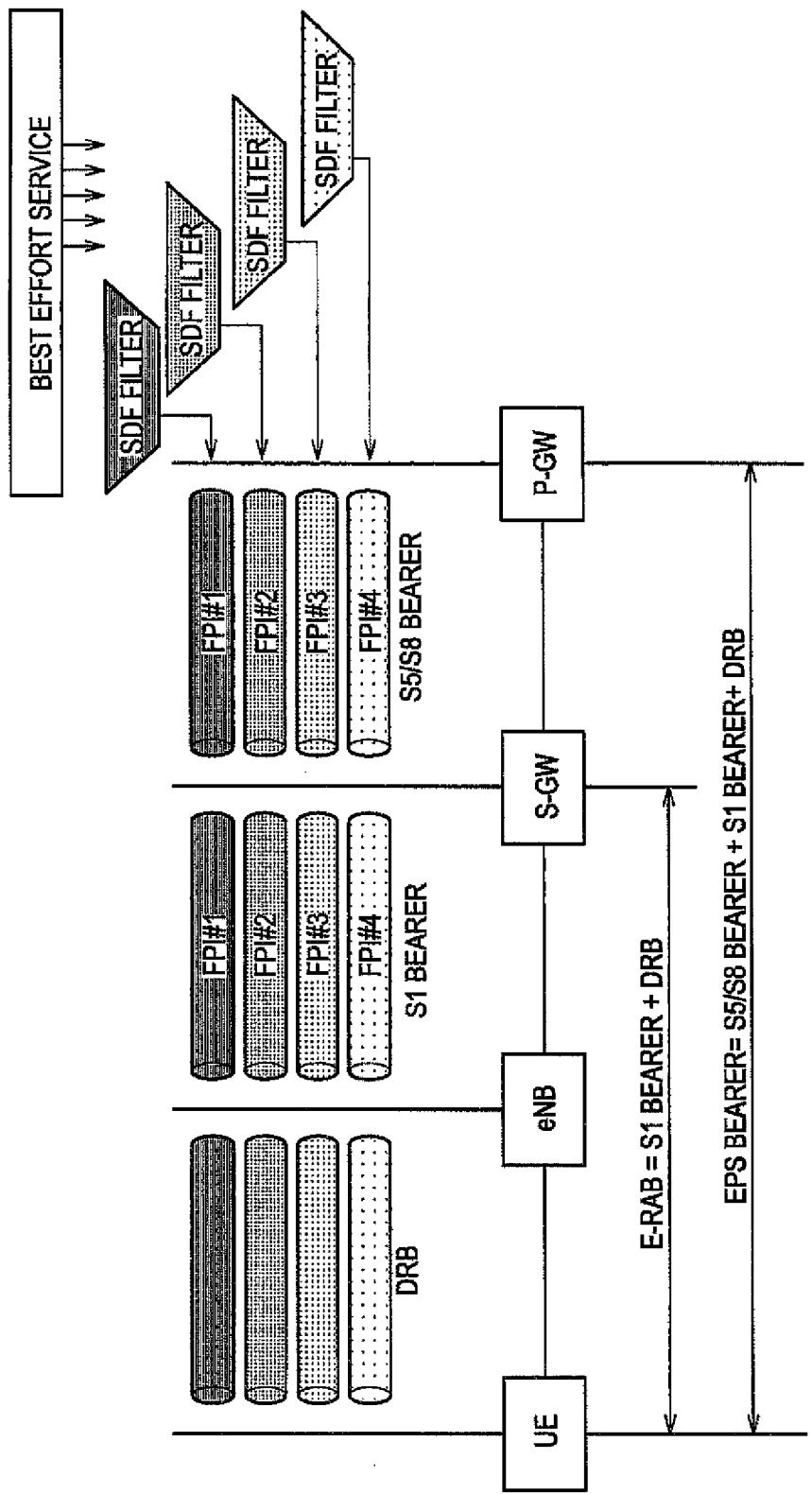
FIG. 2 is a diagram of a configuration of an EPS bearer in the mobile communication system according to the first embodiment of the present invention.

As shown in FIG. 2, in the mobile communication system according to the present embodiment, each EPS bearer is constituted by one DRB (Data Radio Bearer), one S1 bearer, and one S5/S8 bearer.

The DRB is a data radio bearer established between the mobile station UE and the radio base station eNB, the S1 bearer is a bearer established between the radio base station eNB and the gateway device S-GW, and the S5/S8 bearer is a bearer established between the gateway device S-GW and the gateway device P-GW.

In the mobile communication system according to the present embodiment, each E-RAB (E-UTRAN Access Bearer) is constituted by one DRB and one S1 bearer.

In the mobile communication system according to the present embodiment, one EPS bearer, one E-RAB, and one DRB are established for each FPI, taking the application into consideration.

In other words, in the mobile communication system according to the present embodiment, one DRB, one S1 bearer, and one S5/S8 bearer are established per FPI.

Accordingly, in the mobile communication system according to the present embodiment, plural EPS bearers are established for data for the same best effort service.

In the mobile communication system according to the present embodiment, the mobility management node MME notifies the radio base station eNB, in an "Initial Context Setup procedure" or an "E-RAB Setup procedure" the following pieces of information in an associated form: an "E-RAB ID" of the E-RAB to be established between the gateway device S-GW and the mobile station UE; one QCI that is assigned to the E-RAB; and one FPI that is assigned to data flow transmitted on the E-RAB.

For example, the mobility management node MME notifies the following pieces of information in an associated form: the "E-RAB ID" of the E-RAB to be established between the gateway device S-GW and the mobile station UE by using an information element "E-RAB ID" in an "Initial Context Setup Request (see FIG. 3)"; one QCI that is assigned to the E-RAB by using an information element "QCI" in an information element "E-RAB Level QoS Parameters (see FIG. 4)" in the "Initial Context Setup Request (see FIG. 3)"; and one FPI that is assigned to the data flow transmitted on the E-RAB by using an information element "FPI" in the information element "E-RAB Level QoS Parameters (see FIG. 4)" in the "Initial Context Setup Request (see FIG. 3)".

The radio base station eNB establishes, in response to the above notification, one S1 bearer corresponding to the E-RAB between the gateway device S-GW and the radio base station, and establishes one DRB corresponding to the E-RAB between the mobile station UE and the radio base station eNB.

For example, the radio base station eNB establishes one DRB corresponding to the E-RAB between the mobile station UE and the radio base station eNB by using an information element "Radio Resource Config Dedicated (see FIG. 6)" in an "RRC Connection Reconfiguration (see FIG. 5)".

The radio base station eNB establishes the DRB corresponding to each of plural E-RAB between the mobile station UE and the radio base station eNB by using the information element "Radio Resource Config Dedicated (see FIG. 6)" in the "RRC Connection Reconfiguration (see FIG. 5)", when, in the "Initial Context Setup procedure" or the "E-RAB Setup procedure", the mobility management node MME is attempting to setup plural E-RAB in the radio base station eNB.

Mobile Communication System According to Second Embodiment of Present Invention

The mobile communication system according to the second embodiment of the present invention will be explained below with reference to FIG. 7 to FIG. 10 by focusing on how it differs from the mobile communication system according to the first embodiment.

Figure 7:
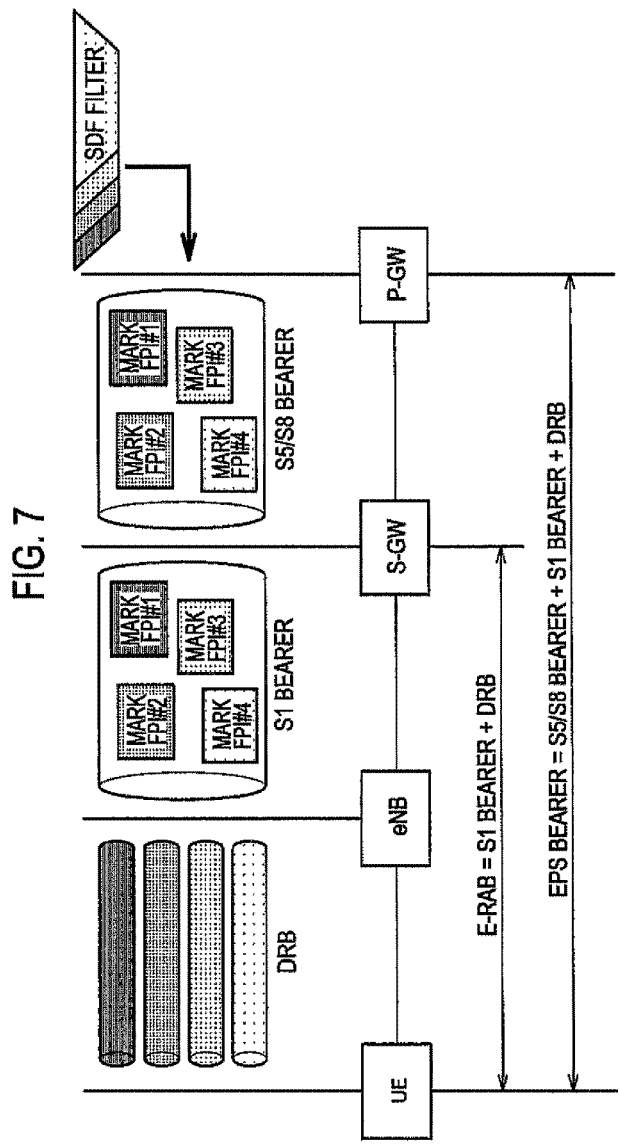
FIG. 7 is a diagram of a configuration of an EPS bearer in a mobile communication system according to a second embodiment of the present invention.

As shown in FIG. 7, in the mobile communication system according to the present embodiment, each EPS bearer is constituted by plural DRB, one S1 bearer, and one S5/S8 bearer.

In the mobile communication system according to the present embodiment, each E-RAB is constituted by plural DRB and one S1 bearer.

Each S1 bearer is established for each QCI and each DRB is established for each FPI that is assigned to the data flow obtained after being transmitted via the S1 bearer of the same QCI.

In the mobile communication system according to the present embodiment, the mobility management node MME notifies the radio base station eNB, in the "Initial Context Setup procedure" or the "E-RAB Setup procedure", the following pieces of information in an associated form: the "E-RAB ID"; the "QCI"; and an FPI list.

For example, the mobility management node MME notifies the following pieces of information in an associated form: the "E-RAB ID" of the E-RAB to be established between the gateway device S-GW and the mobile station UE by using the information element "E-RAB ID" in the "Initial Context Setup Request (see FIG. 3)"; one QCI that is assigned to the E-RAB by using the information element "QCI" in the information element "E-RAB Level QoS Parameters (see FIG. 8)" in the "Initial Context Setup Request (see FIG. 3)"; and the FPI list that includes one or plural FPI that are assigned to the data flow transmitted on the E-RAB by using an information element "FPI List" in the information element "E-RAB Level QoS Parameters (see FIG. 8)" in the "Initial Context Setup Request (see FIG. 3)".

The radio base station eNB establishes, in response to the above notification, one S1 bearer corresponding to the E-RAB between the gateway device S-GW and the radio base station eNB, and establishes one or plural DRB corresponding to the FPI in the FPI list corresponding to the E-RAB between the mobile station UE and the radio base station eNB.

For example, the radio base station eNB establishes one or plural DRB corresponding to the E-RAB between the mobile station UE and the radio base station eNB by using the information element "Radio Resource Config Dedicated (see FIG. 10)" in the "RRC Connection Reconfiguration (see FIG. 9)".

Mobile Communication System According to Third Embodiment of Present Invention The mobile communication system according to the third embodiment of the present invention will be explained below with reference to FIG. 11 to FIG. 15 by focusing on how it differs from the mobile communication system according to the first embodiment.

Figure 11:
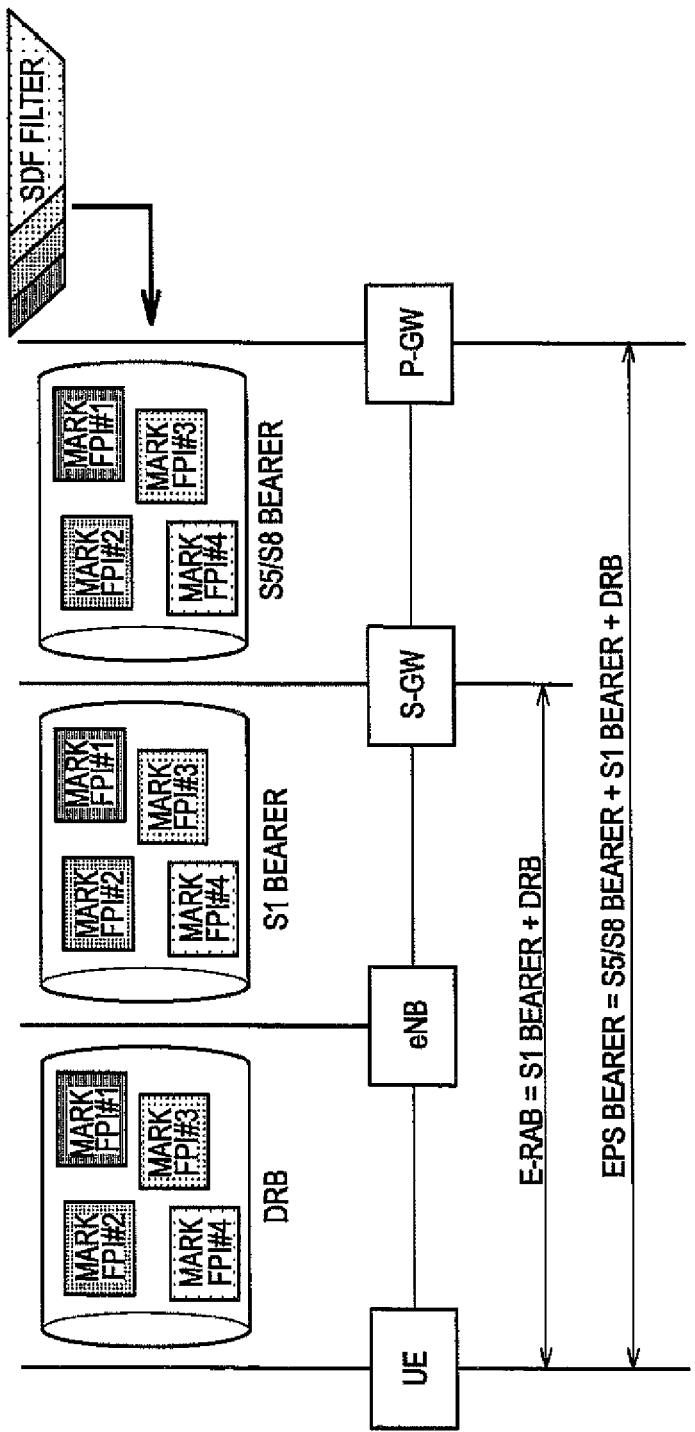
FIG. 11 is a diagram of a configuration of an EPS bearer in a mobile communication system according to a third embodiment of the present invention.

As shown in FIG. 11, in the mobile communication system according to the present embodiment, each EPS bearer is constituted by one DRB, one S1 bearer, and one S5/S8 bearer.

In the mobile communication system according to the present embodiment, each E-RAB is constituted by one DRB and one S1 bearer.

In the mobile communication system according to the present embodiment, the radio base station eNB performs a priority control in a PDCP (Packet Data Convergence Protocol) layer based on a DFP (Data Flow Priority) corresponding to each FPI on each DRB.

In the mobile communication system according to the present embodiment, the mobility management node MME notifies the radio base station eNB, in the "Initial Context Setup procedure" or the "E-RAB Setup procedure", the following pieces of information in an associated form: the "E-RAB ID"; the "QCI"; and an FPI list.

For example, the mobility management node MME notifies the following pieces of information in an associated form: the "E-RAB ID" of the E-RAB to be established between the gateway device S-GW and the mobile station UE by using the information element "E-RAB ID" in the "Initial Context Setup Request (see FIG. 3)"; one QCI that is assigned to the E-RAB by using the information element "QCI" in the information element "E-RAB Level QoS Parameters (see FIG. 12)" in the "Initial Context Setup Request (see FIG. 3)"; and the FPI list that includes one or plural FPI that are assigned to the data flow transmitted on the E-RAB by using the information element "FPI List" in the information element "E-RAB Level QoS Parameters (see FIG. 12)" in the "Initial Context Setup Request (see FIG. 3)".

The radio base station eNB establishes, in response to the above notification, one S1 bearer corresponding to the E-RAB between the gateway device S-GW and the radio base station eNB, and establishes one or plural DRB corresponding to the FPI in the FPI list corresponding to the E-RAB between the mobile station UE and the radio base station eNB.

For example, the radio base station eNB establishes one or plural DRB corresponding to the E-RAB between the mobile station UE and the radio base station eNB by using the information element "Radio Resource Config Dedicated (see FIG. 14)" in the "RRC Connection Reconfiguration (see FIG. 13)".

Moreover, the radio base station eNB instructs the mobile station UE, by using an information element "PDCP-Config (see FIG. 15)" in the information element "Radio Resource Config Dedicated (see FIG. 14)" in the "RRC Connection Reconfiguration (see FIG. 13)", to set up the DFP on the DRB.

Modifications

The mobile communication system according to the first to third embodiments, in a "Handover Preparation procedure", can be modified to hand over a setting pertaining to the above FPI from a handover source radio base station S-eNB to a handover target radio base station T-eNB.

When such a configuration is adopted, the handover target radio base station T-eNB can be modified to decide whether to set the EPS bearer by using the handed over setting pertaining to the FPI, in accordance with its own handling situation of the FPI, capability of the mobile station UE ("UE Capability"), and the like.

The characteristics of the above embodiments can also be realized as explained below.

A mobile communication system according to an aspect of the present invention includes a mobility management node MME, a gateway device S-GW, a radio base station eNB, and a mobile station UE. The mobility management node MME notifies the radio base station eNB, in an "Initial Context Setup Procedure (initial context setup procedure)" or an "E-RAB Setup Procedure (bearer setup procedure)", following pieces of information in an associated form: an "E-RAB ID (identification information)" of an E-RAB (radio access bearer) to be established between the gateway device S-GW and the mobile station UE, one QCI (bearer priority) that is assigned to the E-RAB, and one FPI (flow priority) that is assigned to data flow transmitted on the E-RAB. The radio base station eNB establishes, in response to the notification, one S1 bearer corresponding to the E-RAB between the gateway device S-GW and the radio base station eNB, and the radio base station eNB establishes, in response to the notification, one DRB (data radio bearer) corresponding to the E-RAB between the mobile station UE and the radio base station eNB.

According to the above characteristic, a priority control that is more elaborate than that is performed by using the QCI can be performed without having to change the configuration of the existing EPS bearer.

A mobile communication system according to another aspect of the present invention includes a mobility management node MME, a gateway device S-GW, a radio base station eNB, and a mobile station UE. The mobility management node MME notifies the radio base station eNB, in an "Initial Context Setup Procedure" or an "E-RAB Setup Procedure", following pieces of information in an associated form: an "E-RAB ID", a QCI, and an FPI list. The radio base station eNB establishes, in response to the notification, one S1 bearer corresponding to the -E-RAB between the gateway device S-GW and the radio base station eNB, and the radio base station eNB establishes, in response to the notification, one or plural DRBs corresponding to the FPIs in the list corresponding to the E-RAB between the mobile station UE and the radio base station eNB.

According to the above characteristic, a priority control that is more elaborate than that is performed by using the QCI can be performed without having to increase the setting number of the S1 bearer and the S5/S8 bearer.

A mobile communication system according to still another aspect of the present invention includes a mobility management node MME, a gateway device S-GW, a radio base station eNB, and a mobile station UE. The mobility management node notifies the radio base station eNB, in an "Initial Context Setup Procedure" or an "E-RAB Setup Procedure", following pieces of information in an associated form: an "E-RAB ID", a QCI, and an FPI list. The radio base station eNB establishes, in response to the notification, one S1 bearer corresponding to the E-RAB between the gateway device S-GW and the radio base station eNB. The radio base station establishes eNB, in response to the notification, one DRB corresponding to the E-RAB between the mobile station UE and the radio base station eNB, and the radio base station eNB instructs the mobile station UE to set up a DFP (priority in a PDCP) corresponding to each of the FPIs on the DRB.

According to the above characteristic, a priority control that is more elaborate than that is performed by using the QCI can be performed without having to increase the setting numbers of eight bearers.

Operations of the above mobile station UE, the radio base station eNB, the mobility management node MME, and the gateway devices S-GW/P-GW can be realized with hardware or with software modules that are executed by processors, or with a combination of both.

The software modules can be provided in any type of a storage medium, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to a processor so as to be readable by the processor. The storage medium can be integrated with the processor. The storage medium and the processor can be provided within an ASIC. The ASIC can be provided within the mobile station UE, the radio base station eNB, the mobility management node MME, and the gateway devices S-GW/P-GW. In an alternative configuration, the storage medium and the processor can be provided as discrete components in the mobile station UE, the radio base station eNB, the mobility management node MME, and the gateway devices S-GW/P-GW.

The present invention has been explained in detail by using the abovementioned embodiment. However, it is obvious for a person skilled in the art that the present invention is not limited to the embodiment explained in the present description. The present invention can be implemented as modified and changed modes without deviating the gist and the range of the present invention specified by the claims. Accordingly, the indication of the present description aims at exemplary explanation, and has no intention to limit to the present invention.

The entire contents of Japanese Patent Application 2013-077040 (filed on Apr. 2, 2013) are incorporated in the description of the present application by reference.

INDUSTRIAL APPLICABILITY

As explained above, according to the present invention, it is possible to provide a mobile communication system capable of performing a priority control that is more elaborate than that is performed by using a QCI.

| EXPLANATION OF REFERENCE NUMERALS | |
| --- | --- |
| UE | Mobile station |
| eNB | Radio base station |
| MME | Mobility management node |
| S-GW, P-GW | Gateway device |

The invention claimed is:

1. A mobile communication system comprising a mobility management node, a gateway device, a radio base station, and a mobile station, wherein the mobility management node notifies the radio base station, in an initial context setup procedure or a bearer setup procedure, following pieces of information in an associated form,
identification information of a radio access bearer to be established between the gateway device and the mobile station,
one bearer priority that is assigned to the radio access bearer, and
one flow priority that is assigned to data flow transmitted on the radio access bearer,
the radio base station establishes, in response to the notification, one S1 bearer corresponding to the radio access bearer between the gateway device and the radio base station, and
the radio base station establishes, in response to the notification, one data radio bearer corresponding to the radio access bearer between the mobile station and the radio base station.

2. A mobile communication system comprising a mobility management node, a gateway device, a radio base station, and a mobile station, wherein the mobility management node notifies the radio base station, in an initial context setup procedure or a bearer setup procedure, following pieces of information in an associated form,
identification information of a radio access bearer to be established between the gateway device and the mobile station, one bearer priority that is assigned to the radio access bearer, and a list of flow priorities that is assigned to data flow transmitted on the radio access bearer, the radio base station establishes, in response to the notification, one S1 bearer corresponding to the radio access bearer between the gateway device and the radio base station, and the radio base station establishes, in response to the notification, one or plural data radio bearers corresponding to the flow priorities in the list corresponding to the radio access bearer between the mobile station and the radio base station.

3. A mobile communication system comprising a mobility management node, a gateway device, a radio base station, and a mobile station, wherein the mobility management node notifies the radio base station, in an initial context setup procedure or a bearer setup procedure, following pieces of information in an associated form, identification information of a radio access bearer to be established between the gateway device and the mobile station, one bearer priority that is assigned to the radio access bearer, and a list of flow priorities that is assigned to data flow transmitted on the radio access bearer, the radio base station establishes, in response to the notification, one S1 bearer corresponding to the radio access bearer between the gateway device and the radio base station, the radio base station establishes, in response to the notification, one data radio bearer corresponding to the radio access bearer between the mobile station and the radio base station, and the radio base station instructs the mobile station to set up a priority in a Packet Data Convergence Protocol (PDCP) corresponding to each of the flow priorities on the data radio bearer.

\* \* \* \* \*